Jan. 29, 1935.　　　　F. MOHLER　　　　1,989,523
CONTROL SYSTEM
Filed Oct. 11, 1933
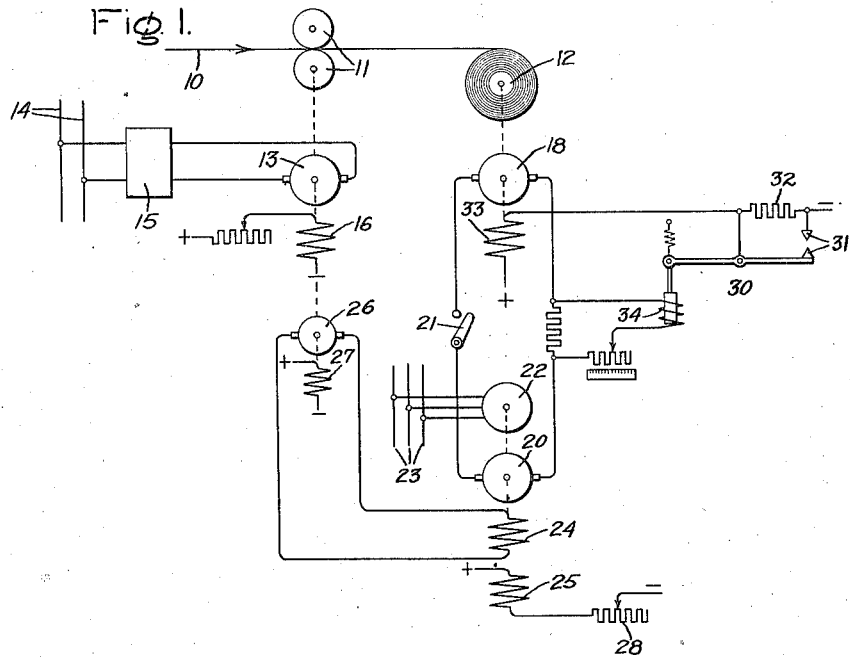
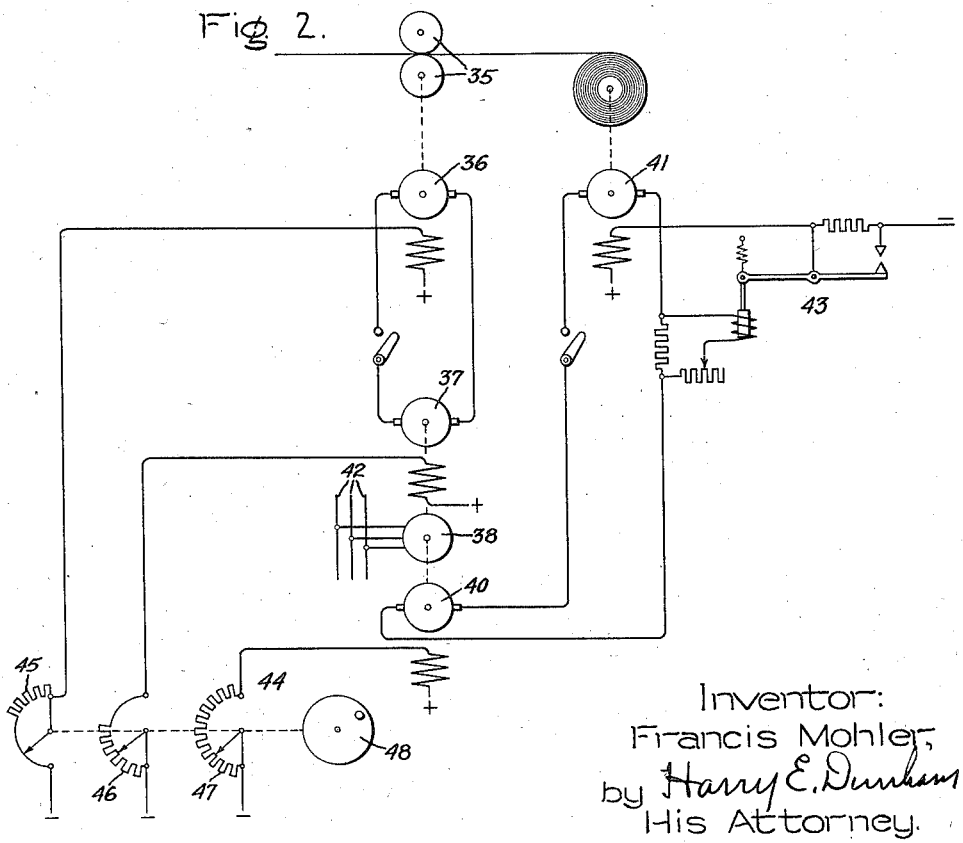
Inventor:
Francis Mohler,
by Harry E. Dunham
His Attorney.

Patented Jan. 29, 1935

1,989,523

UNITED STATES PATENT OFFICE 1,989,523

CONTROL SYSTEM

Francis Mohler, Schenectady, N. Y., assignor to General Electric Company, a corporation of New York Application October 11, 1933, Serial No. 693,140

6 Claims. (Cl. 242—75)

This invention relates to control systems, more particularly to systems for controlling the operation of electric motors employed to drive apparatus operating on a strip of material, such for example as cold strip steel rolling mills and the like and it has for an object the provision of a simple, reliable and improved system of this character.

More specifically the invention relates to systems for controlling the operation of apparatus of the above type in which an electric motor driven reel is utilized either to supply the strip to the element operating thereon, or to wind up the strip as it is delivered from the operating element, and more specific objects of the invention are the provision of means for maintaining substantially constant tension in the strip between the reel and operating element at all operating speeds of the apparatus and to prevent loss of tension when the apparatus is started or stopped.

In carrying the invention into effect in one form thereof, the element operating on the strip and the reel each separately driven by individual electric motors and a generator is provided for supplying the reel motor, together with means for controlling the excitation of this generator in accordance with the speed of the strip so that the speed of the reel motor is also proportional to the strip speed. The generator is provided in one embodiment with a separately excited auxiliary field winding for exciting the generator so as to energize the reel motor and cause the latter to maintain stalled tension in the strip when the apparatus is stopped.

In illustrating the invention in one form thereof, it is shown as embodied in a motor control system particularly adapted for controlling the rolling operations of a cold strip steel rolling mill.

For a better and more complete understanding of the invention, reference should now be had to the following specification and to the accompanying drawing in which Fig. 1 is a simple diagrammatical representation of an embodiment of the invention and Fig. 2 is a simple diagrammatical representation of a modification of the system of Fig. 1.

Referring now to the drawing a strip of material 10, such for example as cold strip steel, is being passed through the reducing mill rolls 11 in the direction of the arrow and the strip delivered from the mill rolls is being wound upon a reel 12. The mill rolls 11 are driven by any suitable driving means shown by way of illustration as a direct current adjustable speed driving motor 13, which in turn is supplied from a suitable source, represented by the two supply lines 14. A starter 15 shown conventionally, is included in the connections between the motor and its source and serves to accelerate the motor 13 from rest to its operating speed in a well-understood manner. As shown, the motor 13 is provided with a separately excited field winding 16 which is supplied from a suitable source indicated by the plus and minus signs and which source may be, and preferably is, the same as that indicated by the supply lines 14. A variable resistance is included in the circuit of the field winding 16 for adjusting the speed of the motor 13 to any desired value.

The reel 12 is driven by a direct current motor 18 which in turn is supplied from a suitable variable voltage generator 20 when the loop circuit between the armatures of the motor 18 and the generator 20 is closed by means of a switching device 21. The generator 20 is driven at a speed which is preferably substantially constant by any suitable driving means such for example as the alternating current motor 22 which in turn is supplied from a suitable source represented in the drawing by the three supply lines 23. The motor 22 may be either an induction motor or a synchronous motor. The connection of the armature of the driving motor 18 in circuit with the armature of the variable voltage generator 20 is usually referred to in the art as a Ward-Leonard type connection and it has the advantage that the voltage of the generator and the speed of the motor 18 can be smoothly and economically varied over a wide range.

As shown, the reel motor supply generator 20 is provided with a main field winding 24 and with an auxiliary field winding 25 which is wound so as to act cumulatively with the main field winding 24. The main field winding 24 is supplied from a pilot exciter 26 which is driven at a speed proportional to the speed of the strip 10. In the embodiment shown, the exciter 26 is driven by the mill motor 13. This exciter is provided with a field winding 27, supplied from a suitable source indicated by the plus and minus signs and which source may be, and preferably is, the same as that represented by the supply lines 14. The exciter 26 is preferably designed to have a straight line saturation curve and thus the voltage which it generates is substantially proportional to the speed of the strip 10. Similarly, the reel motor supply generator 20 is designed to have a straight line saturation curve and thus its voltage and the speed of the reel motor 18 are proportional to the speed of the strip 10. As shown, the auxiliary field winding 25 is supplied from a separate source indicated by the plus and minus lines. This auxiliary field winding serves to excite the generator 20 sufficiently to cause the motor 18 to exert a pull on the strip 10 and thus maintain a tension between the reel 12 and the mill rolls 11 when the mill motor 13 is stopped. A suitable variable resistance 28 is included in the circuit of the auxiliary field winding and serves to adjust the magnitude of the stalled tension to any desired value.

In order to maintain the tension in the strip between the mill rolls 11 and the reel 12 substantially constant during the rolling operation, a constant current regulator, indicated generally at 30, is provided for the purpose of so controlling the excitation of the reel motor 18 that the current flowing in the armature circuit of this motor is maintained substantially constant.

Although the regulator 30 may be of any suitable type, it is illustrated as being of the well-known vibratory contact type, the contacts 31 of which rapidly open and close to effect the alternate short circuiting of the resistance 32 and insertion of this resistance in the circuit of the field winding 33 of the reel motor 18 to maintain the current in the armature circuit of the motor substantially constant at a value determined by the setting of a variable rheostat included in circuit with the actuating coil 34 of the regulator.

In operation, the switch 21 is first closed to complete the loop circuit between the armature of the supply generator 20 and the reel motor 18. The mill motor 13 is started and accelerated from standstill to the desired operating speed in a well-understood manner by means of the starter 15. The gauge of the strip is suitably reduced by means of the mill rolls 11 and the delivered strip is wound upon the reel 12. The voltage of the exciter 26, as previously pointed out is proportional to the strip speed and since the supply generator 20, which is driven at a substantially constant speed, has its main field winding 24 excited by means of the exciter 26, the voltage of the generator 20 and consequently the speed of the reel motor 18 are both likewise proportional to the speed of the strip 10.

Since the constant current regulator 30 maintains a constant current input to the reel motor 18 by operating upon its field, constant tension is maintained on the strip at all times, irrespective of the delivery speed of the mill. Obviously, this is true when it is considered that if a constant tension is to be maintained on the strip the input to the reel motor must increase in direct proportion to the delivery speed of the mill, and since the regulator 30 maintains constant current and the voltage applied to the reel motor varies in direct proportion to the delivery speed of the mill, the energy input to the reel motor increases in direct proportion to increases in the speed of the strip.

During the winding operation the constant current regulator 30 controls the field 33 of the reel motor so as to maintain the current flowing in the armature current substantially constant, and thus as the diameter of the coil on the reel increases, the field of the reel motor is strengthened under the control of the regulator and thereby the reel motor slows down so as to maintain a constant current input to the reel motor and a substantially constant tension in strip between the reel 12 and the rolls 11.

When the speed of the mill motor 13 is reduced to zero to stop the mill the generated voltage of the pilot exciter 26 is likewise reduced to zero causing the excitation of the supply generator 20 due to its main field winding 24 to be reduced substantially to zero. However, tension in the strip between the rolls 11 and the reel 12 is not lost because the auxiliary field winding 25 continues to excite the generator 20 sufficiently to cause the reel motor 18 to exert a pull on the strip and thus maintain a tension. In this connection, it is obvious of course that the generator 20 continues to be driven by the motor 22 even when the mill is stopped and thus, due to its excitation by its auxiliary field winding 25, it is able to maintain tension in the strip when the mill is stopped. The magnitude of the voltage of the generator 20 when the mill is stopped can be adjusted to any desired value by means of the variable resistance 28 and thus the stalled tension in the strip can be adjusted to any desired value. It is to be noted that with this arrangement there is no interruption of the power supply to the reel motor when the mill is stopped because there is no transfer from one power supply to another. The auxiliary field can also be used for forcing the voltage built up on the reel generator during acceleration, thereby insuring that the reel motor does not lag behind the mill motor.

In the modification of Fig. 2 the mill rolls 35 are driven by an adjustable speed direct current motor 36 supplied from a separate generator 37 which in turn is driven by the same motor 38 that is employed to drive the reel generator 40 from which the reel motor 41 is supplied. As in the system of Fig. 1, the motor 38 is illustrated as an alternating current motor and, preferably, a substantially constant speed motor supplied from the three supply lines 42. This motor may be either an induction motor or a synchronous motor. A constant current regulator 43 is provided for maintaining the current input to the armature of the motor 41 substantially constant. This regulator, as shown, is identical with the regulator shown in Fig. 1. This regulator, however, may be replaced by any well-known satisfactory type of constant current regulator.

Although the mill generator 37 and the reel generator 40 are illustrated as being driven by the same motor 38 it will of course be understood that these two generators may be separately driven if desired.

A combination rheostat 44 is provided for controlling the speed of the mill. As illustrated, this rheostat has a resistance section 45 included in the field circuit of the mill motor 36 for controlling the speed of the mill motor by field control, a second resistance portion 46 included in the field circuit of the mill generator 37 for controlling the speed of the mill motor by voltage control and a third portion 47 included in the field circuit of the reel generator 40 for controlling the speed of the reel motor 41 by means of voltage control. The movable contact arms cooperating with the resistance sections 45, 46 and 47 are connected together so that they can be operated by a common control device illustrated in the drawing as a hand-wheel 48. These contact arms may be operated either by a manually operated device such for example as the hand-wheel 48 or they may be motor operated. Preferably in practice these contact arms are operated by a small pilot motor but in the drawing a hand-wheel is illustrated for the purpose of simplicity. The resistance sections 45 and 46 are so arranged relative to each other that when their cooperating contact arms are rotated in a clockwise direction by the hand-wheel 48 the resistance section 46 is first gradually short-circuited to strengthen the field of the generator 37 and thereby increase the speed of the motor 36 and when the voltage of the generator 37 has been brought to maximum the resistance section 45 is gradually inserted in the field circuits of the mill motor 36 thereby to further increase the speed of the mill motor.

Thus in operation, the mill is started and accelerated to the desired speed by operation of the rheostat 44 and is also decelerated and stopped by reverse operation of the rheostat.

It will thus be seen that the position of the rheostat indicates the mill motor speed at all times and, therefore, furnishes an indication of the delivery speed of the mill. This makes it possible to eliminate the pilot exciter for supplying excitation to the mill generator and to substitute in its stead the third section 47 of the rheostat for the purpose of adjusting the field of the reel generator in proportion to the mill motor speed and consequently in proportion to the delivery speed of the mill.

One advantage in utilizing the third section of the rheostat as described is the elimination of the pilot exciter. There is also another important advantage and that is that a standard generator, which is more or less saturated can be utilized for supplying the reel motor, because when utilizing a controlling resistance in the field of the reel generator, the ristance can always be so designed that the armature voltage of the generator will be proportional to the delivery speed of the mill.

Since the field of the reel generator 40 is not excited from a pilot exciter but is excited from a separate source of supply, the use of an auxiliary field is not necessary. The voltage of the reel generator can be adjusted to any desired value when the rheostat is in the "off" position indicating that the mill motor is stopped. This is done by adjusting the amount of resistance in the circuit of the reel generator field at that time.

With the exception that the mill speed and reel generator voltage are controlled by a common rheostat, the operation is otherwise identical with the operation of the system of Fig. 1 previously described and consequently repetition is unnecessary.

Although in accordance with the provisions of the patent statutes, this invention is described as embodied in concrete form, it will be understood that the apparatus and connections shown are merely illustrative and that the invention is not limited thereto since alterations and modifications will readily suggest themselves to persons skilled in the art without departing from the true spirit of this invention or the scope of the annexed claims.

What I claim as new and desire to secure by Letters Patent of the United States is:

1. A control system for apparatus having an element operating on a strip of material and a reel for said strip comprising a motor for driving said element, and a dynamo-electric machine connected to said reel, a variable voltage generator connected to said dynamo-electric machine, said generator being provided with a field circuit, means for varying the excitation of said generator so as to control its voltage in accordance with the speed of said motor and means for stopping said element and reel while maintaining said field circuit closed and energized during deceleration and when said element and reel are stopped thereby to prevent loss of tension.

2. A control system for apparatus having an element for operating on a strip of material and a reel for said strip comprising a motor for driving said element, a dynamo-electric machine connected to said reel, a variable voltage generator electrically connected to said dynamo-electric machine, said generator being provided with a field circuit, a regulating device for maintaining the current of said dynamo-electric machine substantially constant thereby to maintain the tension in said strip substantially constant, means for controlling the excitation of said generator to vary its voltage in accordance with the speed of said strip whereby the tension in said strip is maintained substantially constant at all strip speeds and means for stopping said element and reel while maintaining said field circuit closed and energized during deceleration and when said element and reel are stopped thereby to prevent loss of tension.

3. A control system for rolling mill apparatus and the like having an element operating on a strip of material and a winding reel for said strip comprising a motor for driving said element, a separate motor for driving said reel, a variable voltage generator for supplying said reel motor and an exciter driven by said first mentioned motor for exciting said generator so that its voltage varies in accordance with the speed of said strip.

4. A control system for rolling mill apparatus and the like having mill rolls for operating on a strip of material and a winding reel for said strip comprising a motor for driving said mill rolls, a motor for driving said reel, supply means for said reel motor comprising a variable voltage generator provided with a main field winding and an exciter driven by said mill motor connected to said field winding for varying the voltage of said generator in accordance with the speed of said strip, and a separately excited auxiliary field winding on said generator for energizing said reel motor to maintain stalled tension in said strip when said mill is stopped.

5. A control system for apparatus having an element operating on a strip of material and a reel for said strip comprising a motor for driving said element, a motor for driving said reel, a pair of variable voltage supply generators individualized to said motors, and means common to both said generators for simultaneously varying the excitation of both said generators to vary the speed of both said motors.

6. A control system for apparatus having a pair of mill rolls operating on a strip of material and a winding reel for said strip comprising an electric motor for driving said rolls, a second motor for driving said reel, a variable voltage generator for supplying said roll motor, a second variable voltage generator for supplying said reel motor, a rheostat in circuit with said mill motor for varying the speed thereof, a second rheostat for controlling the voltage of said mill motor supply generator, a third rheostat for varying the voltage of said reel motor supply generator and a common connection between said rheostats providing a different voltage of said reel motor supply generator for each mill speed.

FRANCIS MOHLER.

DISCLAIMER 1,989,523.—*Francis Mohler*, Schenectady, N. Y. CONTROL SYSTEM. Patent dated January 29, 1935. Disclaimer filed February 14, 1936, by the assignee, *General Electric Company*.

Hereby enters this disclaimer to claim 5 of the said Letters Patent.
[*Official Gazette March 3, 1936.*]